June 20, 1944.  A. L. PARKER  2,351,874
RELIEF VALVE FOR FUEL TANKS
Filed May 20, 1942  2 Sheets-Sheet 2
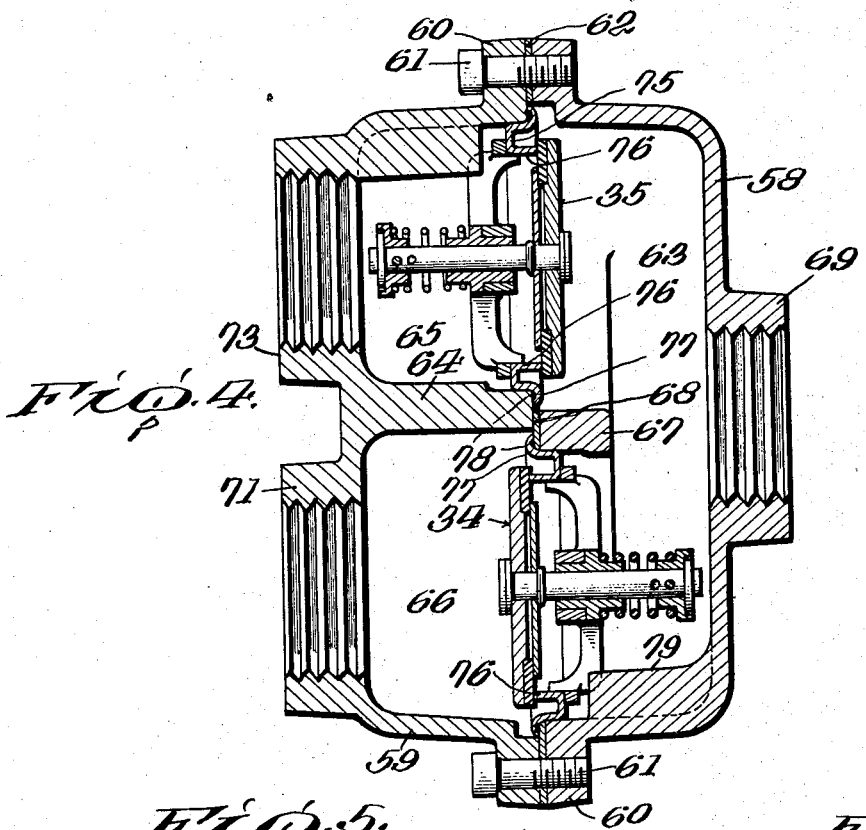
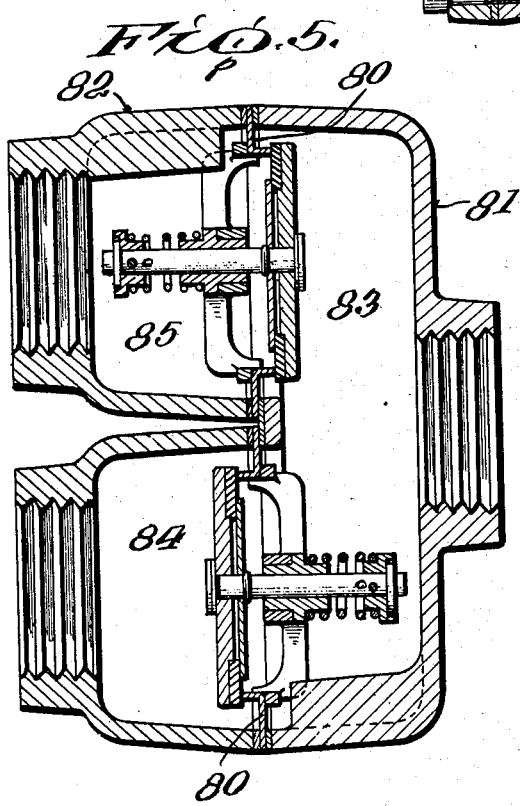
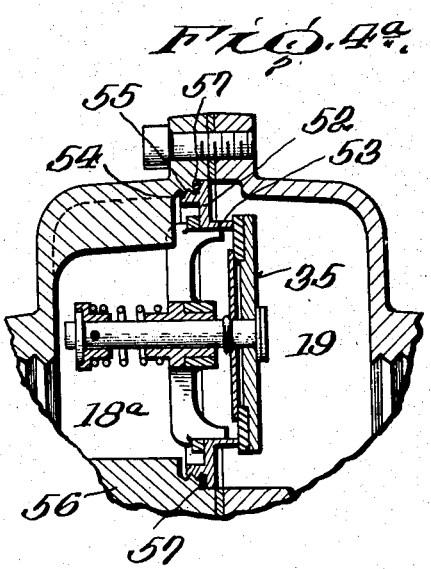
INVENTOR
Arthur L. Parker
Mason, Porter & Diller
ATTORNEYS Patented June 20, 1944

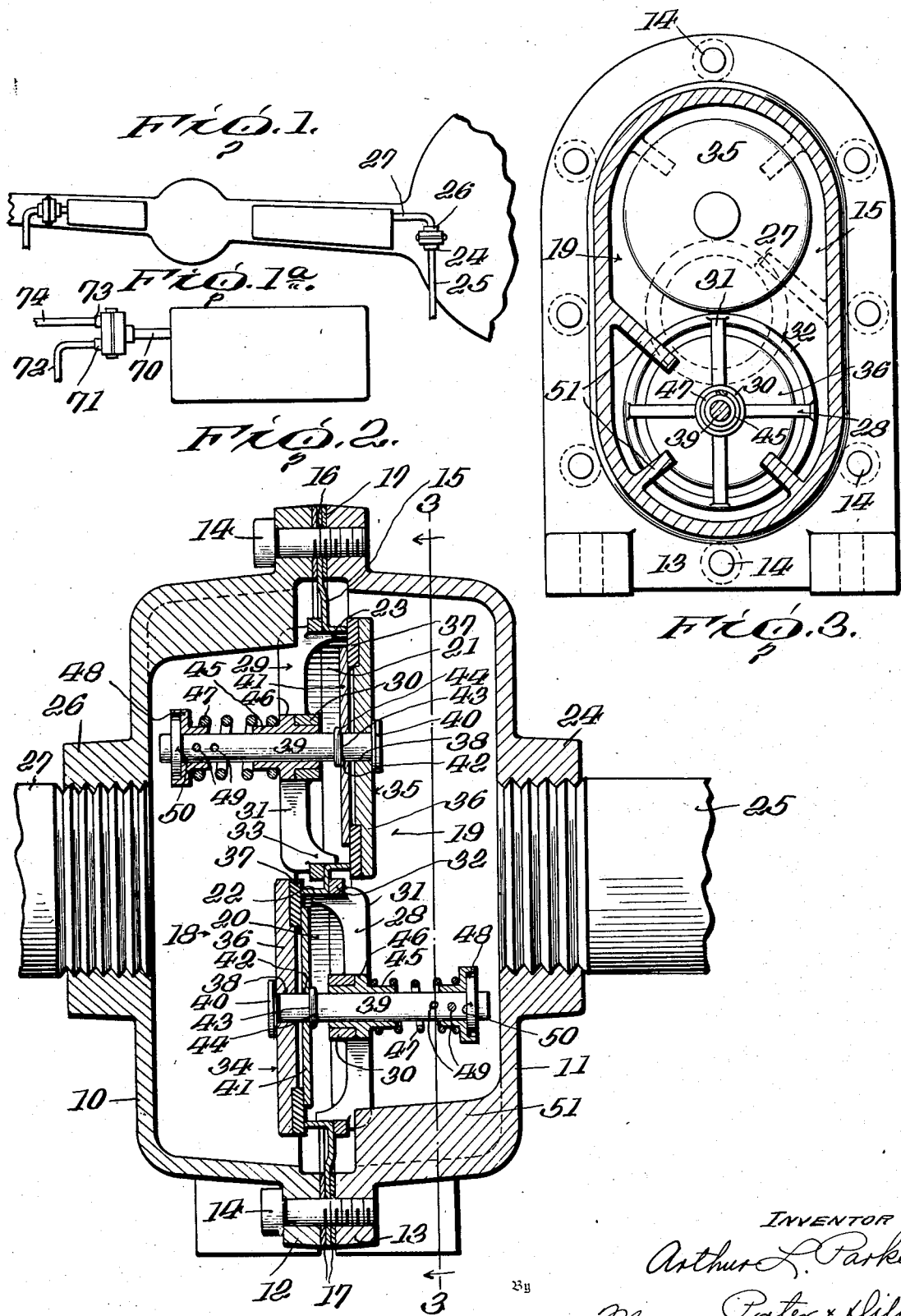

2,351,874

UNITED STATES PATENT OFFICE 2,351,874

RELIEF VALVE FOR FUEL TANKS

Arthur L. Parker, Cleveland, Ohio, assignor to The Parker Appliance Company, Cleveland, Ohio, a corporation of Ohio Application May 20, 1942, Serial No. 443,812

3 Claims. (Cl. 277—61)

The present invention relates to a valve device.

An important object of the invention is to provide a valve device for use in connection with aircraft fuel tanks or the like to maintain the pressure therein at a selected degree.

A further object of the invention is to provide a valve device of the above-mentioned character which will serve to prevent fuel losses in military aircraft during maneuvers.

A further object of the invention is to provide a valve device of the above-mentioned character which will maintain a pressure within the fuel tank of aircraft or the like above atmospheric pressure exteriorly of the tank and will release the pressure when it exceeds a selected degree.

A further object of the invention is to provide an organization wherein the valve cage-member or guide and valve body are both held upon their seats by a common spring.

Other objects and advantages of the invention will be apparent during the course of the following description.

In the accompanying drawings forming a part of this application and in which like numerals are employed to designate like parts throughout the same, Figure 1 is a plan view of one form of valve device embodying my invention, showing the same applied to an auxiliary fuel tank and a main fuel tank of aircraft, Figure 1ᵃ is a similar view of a modified form of valve device embodying my invention, showing the same applied to a fuel tank of aircraft, Figure 2 is a central vertical longitudinal section through the first form of valve device embodying my invention, as shown in Figure 1, Figure 3 is a transverse section taken on line 3—3 of Figure 2, Figure 4ᵃ is a view similar to Figure 2, parts broken away, showing a modified form of seat-adaptor, Figure 4 is a central vertical longitudinal section through the modified form of valve device shown in Figure 1ᵃ, and Figure 5 is a central vertical longitudinal section through a further modification of the invention.

The first and preferred form of valve device is shown in Figures 1, 2, and 3. This valve device comprises casing sections 10 and 11, which are generally cup-shaped and have their inner ends open and provided with marginal flanges 12 and 13 respectively, which are rigidly secured together by screws 14 or the like. Arranged within the casing formed by the casing sections 10 and 11 is a partition 15, preferably formed of stamped sheet metal. This partition is arranged between the marginal flanges 12 and 13 and is clamped in place between them by the screws 14 which pass through openings 16. Washers or packing strips 17 are arranged between the flanges 12 and 13 and the partition. The partition divides the casing into chambers 18 and 19, as shown. The partition is provided with openings 20 and 21, surrounded by flanges 22 and 23, extending longitudinally of the casing in opposite directions. The partition and flanges constitutes a seat-adaptor. The casing section 11 is provided centrally thereof with a screw-threaded tubular boss 24, for receiving a pipe 25, in communication with the atmosphere. The casing section 10 has a screw-threaded tubular boss 26 receiving a pipe 27 which communicates with the interior of the fuel tank.

Arranged within the casing are valve cages or guides 28 and 29, which are identical, but face in opposite directions. Each valve cage comprises a central annular hub 30 having radial arms 31 formed integral therewith and rigidly connected at their outer ends with a ring 32, also preferably formed integral with the arms. The arms 31 have lateral projections or fingers 33, at their outer ends, extending laterally beyond the ring 32. The valve cages or guides have their extensions 33 inserted into the flanges 22 and 23 and these parts may have a sliding fit. The rings 32 contact with the opposite sides of the partition 15.

Associated with the valve cages or guides 28 and 29 are poppet valves 34 and 35. Each poppet valve includes a disk valve-body 36 carrying an annular fibrous contact member 37 which may be formed of rubber or other suitable material and held to the valve-body by any suitable means. This contact member is adapted to engage with the adjacent flange 22 or 23.

The disk valve-body is provided centrally thereof with an opening 38, for receiving a stem 39 having a head 40. The numeral 41 designates a resilient plate which is tensioned to be cup-shaped before being placed under compression. This resilient plate has a central opening 42, to receive the stem 39 and the stem has an annular groove 43 to receive a snap ring 44, to hold the resilient plate under tension. This resilient plate is substantially flat when under compression and engages the fibrous contact member 37 pressing the same against the valve-body 36, and holding it against separation from the valve-body, if there be any tendency for the same to stick to the flange 22 or 23.

The stem 39 is slidable within a bushing 45 inserted within the tubular hub 30 and this bushing has a flange 46 to contact the tubular hub. The bushing extends outwardly beyond the flange 46 to receive thereon and guide a compressible coil spring 47, engaging a head 48 which is adjustably mounted upon the stem 39. The stem has a series of openings 49 to receive a pin 50, also extending through the head 48. It is thus apparent that the head may be adjusted longitudinally upon the stem and secured thereto in the selected adjusted position to regulate the tension of the spring 47. The spring 47 of the pressure inlet poppet valve 34 is lighter than the spring 47 of the pressure outlet poppet valve 35, for a reason to be described.

Particular attention is called to the fact that the spring 47 acting upon the stem 39 moves the contact element 37 of the valve-body 36 into engagement with the flange or seat and this spring acting upon the hub 30 of the valve cage or guide forces the ring 32 into engagement with the partition adjacent to the flange. The casing sections 10 are provided with stop ribs 51, disposed near and spaced from the rings 32, and the purpose of these stop ribs is to prevent the displacement of the extensions 33 from within the flanges, if the same should be apt to occur due to excessive jars or vibration, but the spring 47 ordinarily serves to retain the ring 32 in permanent contact with the partition.

In Figure 4ª, I have shown a modification of the first form of the invention as shown in Figures 1, 2, and 3. In Figure 4ª, the unitary stamped sheet metal partition is omitted and a separate seat-adaptor 52 is provided for each poppet valve. This seat-adaptor has a flange 53 and is provided with a cylindrical screw-threaded extension 54 to engage within a cylindrical screw-threaded part 55 formed in the casing section 10 which is provided with a web 56. The casing section 10 includes separate chambers 18ª, one for each poppet valve but the casing section 11 has the single chamber 19. Each seat-adaptor 53 is sealed by a gasket 57, as shown.

In Figures 1ª and 4 I have shown a modified form of valve device including a casing having a casing section 58 and an opposed casing section 59 having marginal flanges 60 secured together by screws 61 or the like and having a washer 62 secured between the flanges. The casing section 58 has a single chamber 63 while the casing section 59 has a web 64 which divides the casing section into separate chambers 65 and 66. The casing section 58 has a web 67 and a washer or strip 68 is held between the webs 67 and 64. The chamber 63 has a screw-threaded tubular boss 69 for connection with a pipe 70 communicating with the tank. The chamber 66 has a screw-threaded tubular boss 71 for connection with a pipe 72 in communication with the atmosphere while the chamber 65 has a tubular screw-threaded boss 73 for connection with a pipe 74 which communicates with a pump or other pressure source. Arranged within the open ends of the chambers 66 and 65 are seat-adaptors 75, including flanges 76 for coaction with the valve-bodies and the adaptors have annular flanges 77 which are curved in cross-section and receive packing or gaskets 78. These flanges bear against surfaces produced by the casing sections and the webs 64 and 67. The seat-adaptors are held in place by frictional engagement with the walls of the cavities in which they are inserted since they have a press fit therein. The same valve cages and poppet valves 34 and 35 are used as described in connection with the first form of the invention. The spring of the poppet valve 34 for the chamber 65 is heavier than the spring of the poppet valve 35 for the chamber 66. These springs retain the valve-bodies upon the seat-adaptors and also retain the valve cages upon their seat-adaptors. Lugs 79 are provided corresponding to the lugs 51.

In Figure 5 I have shown a modification of the valve device shown in Figure 4. In this figure the seat-adaptors are designated by the numeral 80 and these seat-adaptors are held in position by being clamped between the marginal edges of casing sections 81 and 82. The casing section 81 has a single chamber 83 while casing section 82 has separate chambers 84 and 85. All other parts remain substantially identical with that form of the invention shown and described in Figure 4.

In the constructions shown in Figures 4 and 5, the seat-adaptors may be carried by either casing section.

In the operation of the valve device as shown in Figures 1, 2, and 3, the spring 47 may be so adjusted that when the pressure in the aircraft tank drops below .1 lb. per sq. inch with respect to the outside atmospheric pressure, the poppet valve 34 will open whereby the desired pressure will be restored within the tank. The heavier spring 47 of the poppet valve 35 may be so adjusted that the poppet valve 35 will open when the pressure within the tank is 1 lb. per sq. inch greater than atmospheric pressure outside of the tank. The invention of course is in no sense restricted to these precise pressure differentials but are given as illustrations of pressures which will produce satisfactory reults. It is not desired that atmospheric pressure outside of the tank should substantially exceed pressure within the tank as there may be a tendency for the tank to collapse, but pressure within the tank exceeding atmospheric pressure outside of the tank, within limits, is desirable as it aids in the feed of the gasoline as it is better to have the fuel supplied to the fuel pump under pressure rather than under any considerable suction head.

In the operation of the form of the invention shown in Figures 1a and 4, a pressure within the tank above atmospheric pressure outside of the tank is maintained by air pressure fed through the pipe 74 which passes the poppet valve 35. This poppet valve 35 remains permanently open unless the air pressure from the pump fails, at which time it will close. When the pressure within the tank rises for more than 1 lb. per sq. inch above atmospheric pressure exteriorly of the tank, or other selected pressure, the poppet valve 34 will open, thereby restoring the selected pressure within the tank.

The operation of the valve device in Figure 5 is similar to that in Figure 4.

It is to be understood that the forms of my invention herewith shown and described are to be taken as preferred examples of the same and that various changes in the shape, size, and arrangement of parts may be resorted to without departing from the spirit of my invention or the scope of the subjoined claims.

Having thus described my invention, what I claim is:

1. A valve device for use with fuel tanks of aircraft or the like, comprising a sectional casing, a partition secured between the sections of the casing and dividing the same into chambers, said partition having openings each of which is surrounded by an integral flange disposed so that the edge thereof provides a seat for a valve, a valve cage associated with each opening, each valve cage including an integral tubular hub, spaced radial arms projecting from said hub, a ring secured to the outer ends of the arms and adapted to rest on the partition at the periphery of the opening therethrough, said arms having lateral projections extending into the openings and contacting with the flange for holding said cage centered relative to the opening, a valve associated with each cage and disposed on the opposite side of the partition therefrom and adapted to engage the valve seat, a valve stem carrying the valve and extending through said hub, a detachable head secured to the valve stem, and a spring disposed between the hub and the head for holding the valve cage in engagement with the partition and for yieldingly holding the valve in engagement with its seat.

2. A valve device for use with fuel tanks of aircraft or the like, comprising a sectional casing, a sheet metal partition secured between said sections and dividing the casing into chambers, said partition having openings therethrough, each of which is surrounded by an integral flange, which flanges project in opposite directions from the partition and are disposed so that the edge of each flange provides a seat for a valve, a valve cage associated with each opening and disposed on the opposite side of the partitions from the projecting flanges, each valve cage including a hub, spaced radial arms projecting from the hub, a ring secured to said arms and adapted to engage the partition at the periphery of the opening with which it is associated, said arms having projections extending into the opening and contacting with the flange for preventing lateral movement of the cage, a valve associated with each cage and adapted to engage the valve seat on the projecting flange, a stem connected to said valve and projecting through said hub, a head detachably secured to the valve stem, and a spring disposed between the hub and the head for holding said cage in engagement with the partition and for yieldingly holding the valve in engagement with its seat.

3. A valve device for use with fuel tanks of aircraft or the like, comprising a sectional casing, a sheet metal partition secured between the sections of the casing and dividing the same into chambers, said partition having openings each of which is surrounded by an integral flange, which flanges are disposed so as to project from opposite sides of the partition and so that the edges thereof form seats for valves, a valve cage associated with each opening and disposed on the opposite side of the partition from the projecting flange, each flange cage including a hub, a bushing mounted in said hub and having an abutment shoulder, spaced radial arms formed integral with the hub and projecting therefrom, a ring carried by said arms and adapted to engage the partition at the periphery of the opening with which the valve cage is associated, said arms having projections extending into the openings and engaging the flange for preventing lateral movement of the valve cage, a valve associated with each valve cage and adapted to engage the valve seat on the flange, a valve stem extending through said bushing, a head adjustably secured to the outer end of said valve stem, and a spring disposed between the bushing and the head and operating to hold the valve cage in engagement with the partition and to hold the valve in yielding engagement with the valve seat.

ARTHUR L. PARKER.